V. F. SIMON.
NUT BLANCHING MACHINE.
APPLICATION FILED JAN. 19, 1917.
1,275,314.
Patented Aug. 13, 1918.
3 SHEETS—SHEET 1.
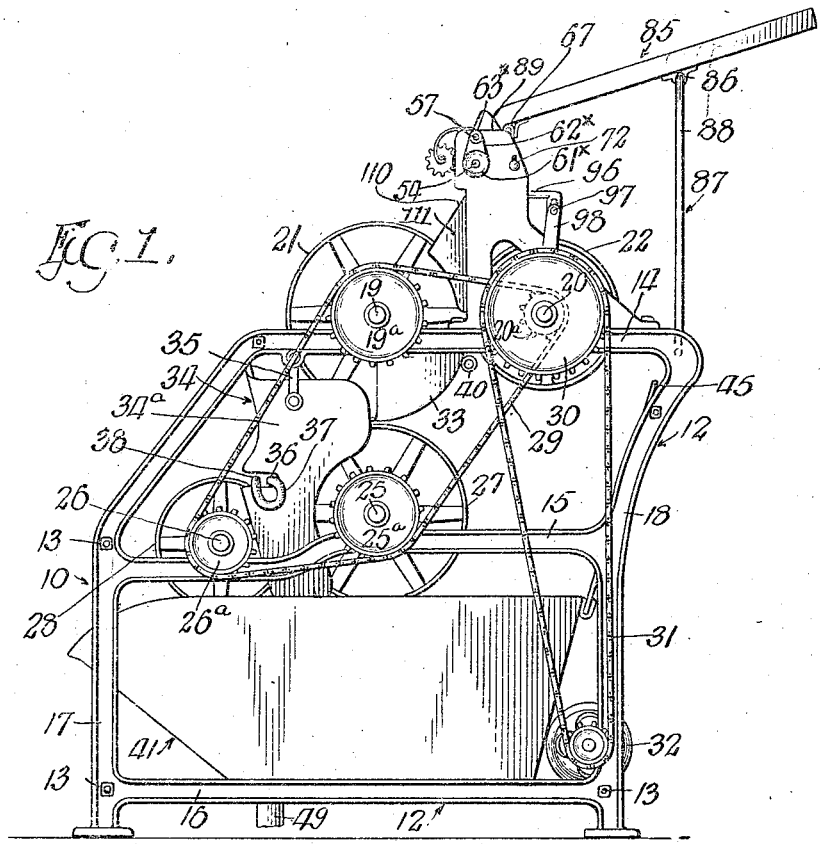
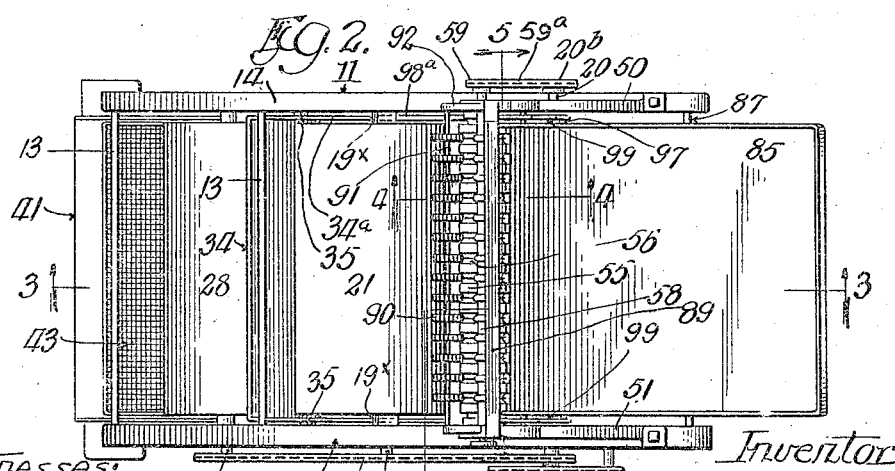

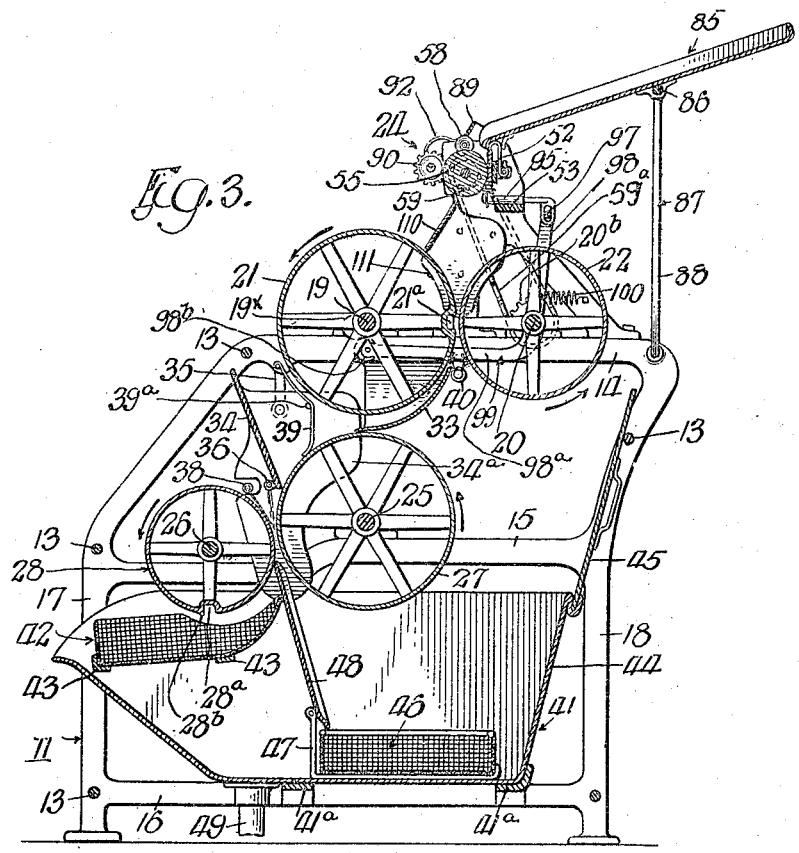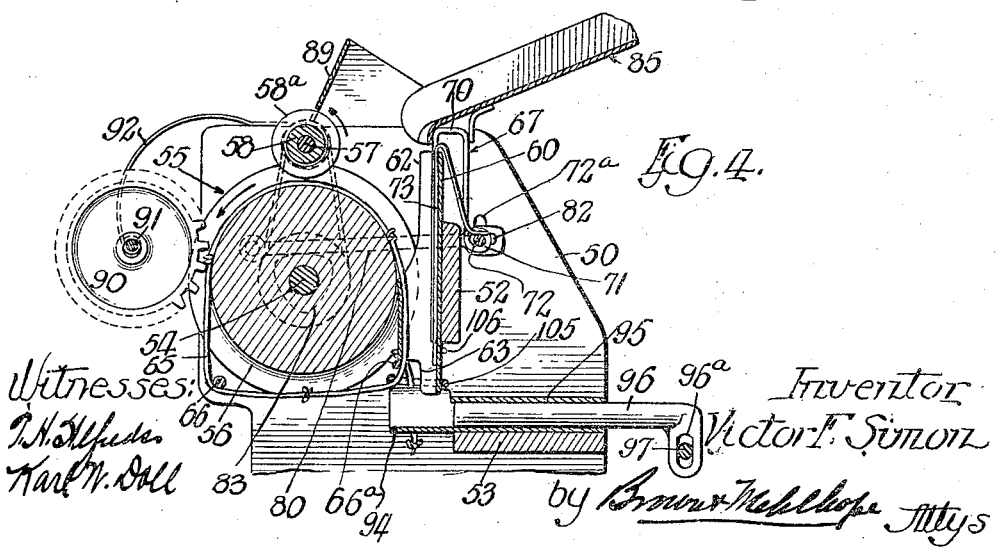

V. F. SIMON.
NUT BLANCHING MACHINE.
APPLICATION FILED JAN. 19, 1917.

1,275,314.

Patented Aug. 13, 1918.
3 SHEETS—SHEET 3.

Witnesses:

Inventor
Victor F. Simon
by Brown & Mehlhope
Attys

UNITED STATES PATENT OFFICE.

VICTOR F. SIMON, OF CHICAGO, ILLINOIS.

NUT-BLANCHING MACHINE.

1,275,314.  Specification of Letters Patent.  Patented Aug. 13, 1918.

Application filed January 19, 1917. Serial No. 143,327.

*To all whom it may concern:*

Be it known that I, VICTOR F. SIMON, a citizen of the United States, and a resident of Chicago, in the county of Cook and State of Illinois, have invented certain new and useful Improvements in Nut-Blanching Machines; and I do hereby declare that the following is a full, clear, and exact description thereof, reference being had to the accompanying drawings, and to the letters of reference marked thereon, which form a part of this specification.

This invention relates to improvements in nut kernel blanching machines, and consists of the matters hereinafter described and more particularly pointed out in the appended claims.

The object of the invention is to provide a machine which will efficiently and quickly blanch nut kernels such as peanuts, without breaking them or reducing them to "splits." The improved machine is designed to blanch raw or unroasted peanuts after they have been treated by soaking or boiling them in water.

My improved machine comprises in general a magazine hopper adapted to receive the peanuts to be blanched; a set of rolls which operate upon the nuts severally to crack and loosen the skins; a feeding means to deliver the peanuts from the hopper to said rolls; a second set of rolls adapted to receive the peanuts from the first set of rolls, and to support and rotate them severally in a position where they are effectually operated upon by a fluid under pressure to remove the loosened skins;—the blanched peanuts being picked up by one of said last mentioned pair of rolls and deposited in a basket provided therefor, while the skins are deposited in a separate receptacle.

The many advantages of my improved nut blanching machine will more fully appear as I proceed with my specification.

In the drawings:

Figure 1 represents a view in side elevation of my improved nut blanching machine.

Fig. 2 represents a top plan view thereof.

Fig. 3 represents a longitudinal, vertical sectional view, the plane of the section being indicated by the line 3—3 of Fig. 2.

Fig. 4 represents on an enlarged scale, a longitudinal vertical sectional view through the feeding means, the plane of the section being indicated by the line 4—4 of Fig. 2.

Figure 5:
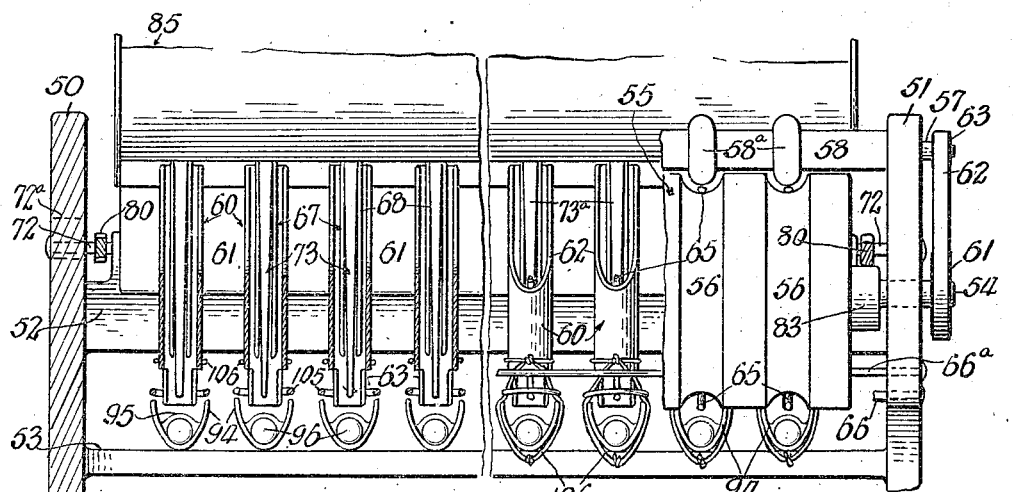
Fig. 5 represents on an enlarged scale, a transverse, vertical sectional view through the improved machine, in a plane indicated by the staggered line 5—5 of Fig. 2.
Figure 6:
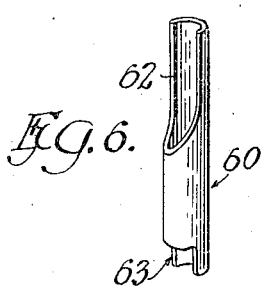
Figs. 6, 7, 8 and 9 are detail, perspective views of parts of the feeding means and will be more particularly referred to later.
Figure 7:
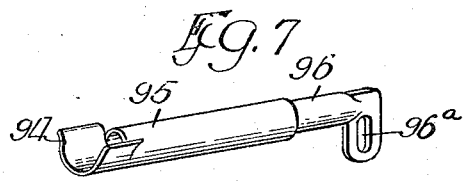

Referring now to that embodiment of my invention illustrated in the drawings:—10 indicates as a whole, a suitable frame adapted to support the various parts of my improved nut kernel blanching machine. Said frame comprises longitudinally extending, spaced, upright, side members 11 and 12, which are rigidly secured together by tie rods 13. As shown, each of said side frame members is a substantially rectangular, open frame member and consists of horizontally arranged top, middle and bottom rails 14, 15 and 16 respectively, and front and rear upright end members 17 and 18, which are inclined rearwardly from the intermediate rail 15 to meet the top rail 14.

Journaled in suitable bearings on the top rails 14 of the said side frame members, are transversely extending shafts 19 and 20, and fixed to said shafts between said frame members, are open, cylindric shell or rolls, 21 and 22 respectively. As shown, the roll 21 is of a diameter greater than that of the roll 22, and is adapted to rotate at a slower speed than that of said roll 22, but in the same direction. A longitudinally extending groove 21ª having closed ends, is formed in the periphery of said drum 21. The drums 21, 22 are spaced apart so that their peripheries almost engage each other, the space between said rolls being somewhat smaller than the diameter of the peanuts to be blanched. The peanuts are delivered into said space between said rolls for the purpose of breaking and loosening the skins therefrom, by a suitable feeding device 24, as will later appear.

Journaled in suitable bearings on the middle rail 15 of the side frame members, are transversely extending shafts 25 and 26. The shaft 25 is arranged vertically below the shaft 19, while the shaft 26 is located in a plane below and in front of that of the shaft 25. An open cylinder or drum 27 of preferably the same diameter as that of the drum 21, but without the groove, is fixed to the shaft 25, between the side members of the frame and a similar but smaller drum 28 is fixed to the shaft 26. The drum 28 has a longitudinally extending groove 28ª in its periphery, similar to the groove 21ª in the drum 21, but along one edge of the groove 28ª is formed a lip 28ᵇ. The function of this lip will appear later. The drums 27, 28 are spaced apart a suitable distance to provide a hopper space, into which the nut kernels operated upon by the rolls 21 and 22 are delivered for the purpose of having the loosened skins removed therefrom. The shaft 26 to which the roll 28 is fixed, is preferably driven or rotated at a higher speed than that of the roll 27.

To that end of each of the shafts 19, 20, 25 and 26, extending beyond the side frame member 12, is fixed a sprocket wheel 19ª, 20ª, 25ª and 26ª respectively, said wheels having a sprocket chain 29 trained about them, so as to rotate in the same direction. Fixed to the said end of the shaft 20 is a large sprocket wheel 30, driven by a sprocket chain 31, from an electric motor 32, suitably supported on the frame member 12 at the junction of the bottom rail 16 and the rear upright 18.

33 indicates a transversely extending, curved guide plate which is fixed at its ends to the underside of the top rails 14 of the frame members, in the vicinity of the roll 21. The bottom edge of said guide plate approximately engages with the top of the roll 27, and such peanuts as are not delivered by gravity from the groove 21ª in the roll 21, as said groove travels downwardly in the rotation of said roll, are prevented from being discharged over the rear side of the roll 27, as the said groove 21ª moves upwardly.

34 indicates a transversely extending, inclined plate which normally engages at its bottom edge, against the periphery of the roll 27. This plate has end walls or plates 34ª, which are suspended by links 35 from the top rails 14ª of said side frame members. The bottom ends of the said end plates 34ª are extended below the bottom edge of the plate 34, so as to overlap a part of the periphery of each of the rolls 27, 28 and prevent such nut kernels as are being operated upon by the rolls 27, 28, from being discharged from the ends of the hopper space between said rolls. The plate 34 together with the end walls 34ª, provide what may properly be termed, a self-unloading hopper, as will presently appear, said hopper being suspended by the links 35, closely adjacent to its center of gravity, so that any outward pressure exerted upon the bottom edge of the plate 34 will cause the said hopper to swing outwardly about its link connection 35, against gravity, and be held in such outward position until the pressure is removed.

Fixed to the bottom edge of the plate 34 on its front face is a water spray pipe 36, which is adapted to direct a forceful needle spray into the space between the rolls 27, 28. The pipe 36 is connected at one end by means of a flexible coupling or hose 37 (see Fig. 1) with a second spray pipe 38, which is relatively stationary with respect to the machine frame. The pipe 38 is connected at that end adjacent the frame member 11 with a suitable supply pipe (not shown), and is adapted to direct its spray into the space between the rolls 27, 28, tangentially with respect to the periphery of the roll 28. The end plates 34ª are cut away to permit of movement of the said plates with respect to the pipe 38.

A transversely extending, flexible curtain 39 is fixed at its top edge, in line with the pivotal connection of the links 35, to the top rails 14 of the side frame members 11 and 12. This curtain is draped about a rod 39ª carried by the side plates 34ª, before mentioned, so as to conform with the periphery of the roll 21, the bottom edge of said curtain engaging the periphery of the roll 27. This curtain prevents such spray or mist as rises during the operation of the spray pipes 36, 38, from engaging and moistening the periphery of the roll 21, as it has been found that the rolls 21, 22, operate to the best advantage when their peripheries are dry. To assist the curtain in keeping the rolls 21, 22 in this desirable condition, a gas burner tube 40 is provided, said burner being located at or near the top edge of the curved guide plate 33, so as to direct its flames onto the periphery of both the rolls 21, 22.

41 indicates an open top receptacle or vat which is substantially of the plan area of the whole machine, and which is suitably supported upon the said frame by means of cross bars 41ª, 41ª, attached to the bottom rails 16. The front end wall of said receptacle is preferably inclined, to permit of easy access to a removable wire mesh basket 42, which is mounted upon cross bars 43 connecting the upright side walls of said receptacle together, near the inclined front end wall. The basket 42 is adapted to receive the blanched peanuts as they are delivered from the roll 28, said basket allowing the water to drain through and into the receptacle 41. The rear wall 44 of said receptacle is also an inclined wall, and has a flanged top edge, which is adapted to receive the bottom edge of a plate 45. This plate engages near its top edge with one of the tie rods 13 connecting the frame members 11 and 12, and may be easily removed, as is apparent.

A second removable, wire mesh basket 46 rests upon L shaped arms 47, fixed to the bottom wall of the receptacle 41. A chute or inclined pan 48 is pivoted at its bottom end to the top ends of the upright members of the L shaped arms 47, the top edge of said chute, normally engaging or resting upon the periphery of the roll 28. This chute is adapted to receive the skins from the nuts operated upon by the rolls 27, 28, the sprays from the pipes 36, 38, washing said skins down said chute into the basket 46. During the rotation of the roll 28, the lip 28ᵇ will engage the top edge of said chute, and move the same rearwardly, so as to pass the same. Thus a vibratory movement is imparted to said chute to facilitate the movement of the skins into the basket 46. Said basket may be removed when full of skins, and emptied and then replaced. A waste pipe 49 is fixed to the bottom wall of the receptacle 41, to lead away the waste water to a suitable place of disposal.

The means 24 before mentioned, for feeding the peanuts to the rolls 21, 22, is constructed as follows:—50, 51 indicate upright standards which are fixed to the top rails 14, 14 of the side members 11 and 12 of the main frame, near their rear ends. These standards have legs which straddle the bearings for the shaft 20 and are connected together at their top ends by transverse bars 52, 53, the bar 52 in this instance being a vertically arranged bar, while the bar 53, is a horizontally arranged bar, (see Figs. 3 and 4). Journaled at its ends in said upright standards, a short distance in front of and approximately in the same plane as the median horizontal plane of the bar 52, is a shaft 54. Fixed to said shaft, between said standards, is a cylinder 55, in the periphery of which are provided a plurality of longitudinally spaced, annular grooves 56. A second shaft 57, is journaled in said standards, vertically above the shaft 54, and fixed to said shaft 57 is a roller 58. This roller has longitudinally spaced annular ribs 58ᵃ which engage within the grooves 56 of the cylinder 55.

Fixed to that end of the shaft 54 projecting beyond the standard 50 is a small sprocket wheel 59 which is driven from a larger sprocket wheel 20ᵇ on the shaft 20 by means of a sprocket chain 59ᵃ. Fixed to the opposite end of said shaft 54 beyond or outside of the standard 51 is a belt pulley 61ˣ, which is connected by a belt 62ˣ to a small pulley 63ˣ on the associated end of the shaft 57. From the construction just described, it is apparent that the cylinder 55 is driven in the same direction, but at a speed greater than that of the roll 22, while the roller 58 is driven in the same direction, but at a speed greater than that of the grooved cylinder 55.

To the front face of the transverse bar 52 is secured a plurality of upright, longitudinally spaced tubes 60 which are of a height approximating the diameter of the grooved cylinder 55. There is one of said tubes associated with and engaged in each groove 56 in the cylinder 55, and each tube is of a diameter approximating the diameter of the associated groove 56. The spaces between said tubes, on said bar 52, are adapted to receive filler blocks 61 (see Fig. 5) said block engaging on their front faces with the peripheral parts of the cylinder 55 between the grooves 56.

Each tube 60 is cut away on its front face, as indicated at 62, from a plane coincident with the horizontal plane of the shaft 54 to its top, to provide a free inlet passage for the peanuts thereto. The bottom end of each tube is also cut away on its front side, as indicated at 63, for about one-half of its peripheral length, this cut-away portion 63 being of a height substantially less than that of the cut-away part 62, before mentioned. An endless belt 65 preferably in the form of a knotted string, such as fishing line, is threaded through each tube 60 and about the associated groove 56 in the cylinder 55. This belt is substantially loose and also passed about rods 66 and 66ᵃ respectively, the rod 66 being fixed at its ends to the standards 50, 51 at a point below and in front of the shaft 54, the rod 66ᵃ also being fixed at its ends in said standards, so as to engage the front bottom edge of all the upright tubes 60. The rod 66ᵃ thus prevents engagement of said strings with the sharp edges of the bottom ends of said tubes.

Figure 8:
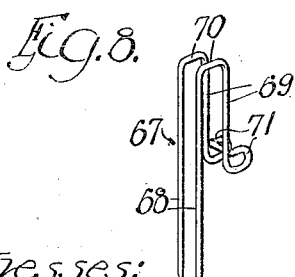
Figure 9:
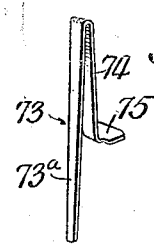

67 (see Fig. 8) indicates a vertically arranged clip, there being one of such clips associated with each tube 60. This clip is preferably made of wire bent to proper form, and comprises upright front and rear legs 68 and 69 which are connected at their top ends by horizontal members 70. The front legs which are the longer, are adapted to engage against the rear inner face of an associated tube. The rear legs terminate at their bottom ends in loops 71, and the loops 71 of all of said clips, are engaged by a transverse rod 72, which has bearing at its ends in vertically arranged slots 72ᵃ formed in the standards 50, 51. The rod 72 is upset at its ends without said standards to prevent endwise movement of said rod. A second clip 73 (see Fig. 9) is associated with each of the clips 67 just described. Said clip 73 is preferably made of sheet metal and comprises a front member 73ᵃ which is longer than and is adapted to engage between the front legs 68 of the clip 67, and a rear member 74 of a length substantially equal to that of the rear legs 69 of the clip 67. This rear member terminates in a foot 75 adapted to rest upon the rod 72 between the loops 71 of a clip 67.

80, 80 indicate horizontally disposed lever arms pivoted at their front ends to the inner faces of the standards 50, 51 at a point in a plane in front of and above that of the shaft 54. Each arm 80 terminates at its rear end in the vicinity of the rod 72, and in said rear end is formed a horizontal slot 82 through which the rod 72 extends. Associated with each arm 80 is a cam 83, said cam being secured to the adjacent ends of the cylinder 55.

An upwardly and rearwardly inclined hopper 85 rests at its front end upon the top ends of all of the clips 67. The rear end of this hopper is pivotally supported upon the transverse member 86 of an inverted U shaped rod 87, the vertical members 88 of which are engaged at their bottom ends in suitable holes provided therefor in the side frame members 11 and 12, at the junction of the top rail 14 and the rear upright member 18. The U shaped rod 87 is so formed that its upright legs 88, 88, may be sprung from their associated openings in the frame members, and be removed therefrom, thus providing a quick detachment of the hopper as a whole for the purpose of cleaning, etc. This hopper is adapted to receive the nut kernels to be blanched, and to prevent a flow of said kernels over the top of the roller 58, an upwardly and rearwardly inclined guard plate 89 is provided, said plate having end walls by means of which it is fixed to the top edges of the standards 50, 51, respectively.

To insure a proper movement of the endless belts 65 about the groove walls in the cylinder 55, there is provided a plurality of toothed wheels 90, one for each endless belt 65. These wheels are loosely mounted on a shaft 91 which is floatingly held by spring arms 92 fixed to the front top ends of the standards 50, 51.

The bottom end of each tube 60 extends into a U shaped, open front end or mouth 94, of an associated, horizontally disposed plunger tube or barrel 95, all of the plunger tubes being supported upon the cross bar 53 before mentioned. A plunger 96 is provided in each plunger tube, and in the rear end of each plunger tube is formed a vertically arranged slot 96$^a$. A rod 97 extends through the slots 96$^a$ of all of said plungers, and said rod is engaged at its ends in the top ends of upright arms 98 of bell crank levers 99. There is one of said levers loosely mounted on the shaft 20 between the end frame members 11 and 12 and the ends of the cylinder 22. The horizontally disposed arm 98$^a$ of said lever extends into the vicinity of and below the shaft 19 where it carries a roller 98$^b$. This roller is engaged by a cam 19$^x$ fixed to the shaft 19, during the rotation of said shaft, thus depressing said arm and causing a forward movement of the plungers 96. A spring 100 fixed to each of the upright arms 98 acts to return said bell crank levers and said plungers to their normal positions.

A ring 105 surrounds the bottom end of each tube 60, said ring being of a somewhat larger diameter than said tube. This ring is adapted to rest loosely upon the upright sides of the mouth 94 of the plunger tube 95. The endless belt 65 before mentioned, is also threaded through said ring. A flexible member 106, in the form of a string, is tied about the bottom end of each tube 60 above its cut-away portion 63. The free ends of said member or string are led from the front side of said tube downwardly and back of the rod 66$^a$, then through the ring and about the mouth end of the plunger tube 95 where they are tied or otherwise secured together. This member 106 tends to provide a more stable support for the ring 105 and prevents wabbling thereof, yet it permits of all the flexibility required for the operation of the ring for its intended purpose. To prevent the peanuts when discharged from the mouth of the plunger tube 95 from being shot over the top of the roll 21, an inclined guard plate 110 is provided. This guard plate has end walls 111 which are attached to the standards 50, 51, the bottom ends of said walls overlapping the ends of the rolls 21, 22, so as to prevent the peanuts being operated upon by said rolls from displacement from the ends of said rolls.

The operation of the machine is as follows:—The peanuts to be blanched are placed in the hopper 85 with some of the peanuts overflowing upon the roll 55 and about the tops of the tubes 60. The several cylinders or rolls all rotate in the same direction, as is indicated by the arrows in Figs. 3 and 4. As the grooved cylinder 55 rotates, it imparts a traveling movement to the several knotted strings 65 with the aid of the toothed wheels 90. This movement of the said cylinder, through the cams 83, arms 80 and rod 72, will impart a vertical, vibratory movement to the clips 67 and 73, in the feed tubes 60. As the front end of the hopper 85 rests upon the members 70 of the clips 67, a rocking vibratory movement about the member 86 as an axis, will be imparted to said hopper to cause the peanuts to be moved toward the grooved cylinder 55.

Such peanuts as are in said tubes 60, are turned and jogged about by the strings 65 and clips 67, 73, until they enter the various tubes in an endwise manner. Thus the peanuts are presented on end to, and rest upon the floors of the plunger tube mouth pieces 94. The top ends of the upright ended peanuts, engage the front end of the rings 105, which yieldingly hold them in their upright ended position. At the proper time, the plungers 96, actuated by the bell crank levers 99 and cams 19$^x$, move forward and engage the peanuts and eject or discharge them from the mouths of the plunger tubes. As the plungers engage the peanuts, and force them outwardly, the front ends of the rings 105 will rise or tilt upwardly, to permit the nuts to pass beneath them. As soon as the nuts have been discharged from the restraining action of said rings, other peanuts already arranged endwise in the tubes 60, above those just discharged by the plungers, will take their place, ready to be discharged as before. The peanuts thus ejected from the plunger tubes, are dropped into the space between the rolls 21 and 22. This discharge occurs just as the groove 21ª in the roll 21 has passed the bottom end of the guard plate 110. As the rolls 21, 22 are rotating, they will impart a similar movement to the peanuts now in the space between them, and this rotating action of the nuts will act to break and loosen the skins therefrom, without danger of splitting or injuring the kernels or "meats" of the peanuts themselves.

As the groove 21ª, in its upward movement during the rotation of the roll 21, approaches the space between said rolls 21, 22, the peanuts will enter or be picked up by said groove, and as said groove passes the bottom edge of the plate 110, more peanuts will be delivered to the space between said rolls, as before. As the groove 21ª travels downwardly in the rotation of said roll 21, the nuts will fall or be discharged from said groove by gravity, upon the inclined plate 34 which will direct them against the roll 27. Such nuts as are not discharged before the groove 21ª approaches the curtain 39, will be directed by the plate 33 downwardly upon the roll 27, which will, in its rotation, carry them into engagement with the bottom edge of the plate 34.

By reason of the rotation of the roll 27, the peanuts lodged against the bottom edge of the plate 34, will exert an outward pressure on said bottom edge, and tend to swing said plate about its link connection 35, away from the roll 27, so that said peanuts will fall into the space between the rolls 27 and 28. These rolls are rotating in the same direction, and will impart a rotative movement to the peanuts lodged in the space between them. The spray pipe 36, will direct a spray of water under pressure, upon the nuts, thus lodged, which will act to remove or wash the loosened skins from the nut kernels or nut meats proper. The spray pipe 38 which directs a needle spray against the peanuts being thus acted upon, will also assist in removing or washing the skins therefrom.

As the groove 28ª in the roll 28 moves upwardly, the lip 28ᵇ will engage the top end of the chute 48, and move the same outwardly, so as to pass the same, the chute, of course, falling back to its normal position, by gravity, after the lip 28ᵇ has thus passed. This lip 28ᵇ will act to direct the peanuts in the space between the rolls 27 and 28 into the groove 28ª of the roll 28. Such skins as tend to adhere to the roll 28, will be washed therefrom and down through the space between said rolls, upon the chute 48, to be delivered to the removable basket 46.

As the groove 28ª which is now loaded with the blanched nuts, moves downwardly during the rotation of the roll 28, it will deliver said nuts to the basket 42. When the said basket has been filled, it may be removed and replaced by a similar basket. When the basket 46 is full of skins, it may be as easily removed and replaced as is the basket 42.

As will be apparent from the foregoing description, the operation upon the peanuts by a rolling action, as is imparted by the several rolls, in no way can injure or split them. The peanuts being isolated from each other during the time they are operated upon by the rolls 21, 22 and the rolls 27 and 28, are acted upon in the same manner as if each peanut being blanched, were being operated upon individually.

While in describing my invention, I have referred to certain details of mechanical construction and arrangement of parts, I do not wish to be limited thereto except as is pointed out in the appended claims.

I claim as my invention:

1. In a nut blanching machine, a pair of parallel rollers adapted to rotate in the same direction and placed with their peripheral surfaces a distance apart less than the thickness of the nuts to be blanched, means for delivering rows of spaced nuts at successive time intervals into the space between the said rollers, and means for discharging the nuts from said space at successive time intervals.

2. In a nut blanching machine, a pair of parallel rollers adapted to rotate in the same direction and placed with their peripheral surfaces a distance apart less than the thickness of the nuts to be blanched, means for delivering rows of spaced nuts at successive time intervals into the space between the said rollers, and means for removing from the nut bodies, the skins broken and loosened by the said rollers.

3. In a nut blanching machine, a pair of parallel rollers adapted to rotate in the same direction and placed with their peripheral surfaces a distance apart less than the thickness of the nuts to be blanched, means for delivering rows of spaced nuts at successive time intervals into the space between the said rollers, and means for subjecting the nut bodies to a fluid blast to remove the skins broken and loosened by the aforesaid rollers.

4. In a nut blanching machine, a pair of parallel rollers adapted to rotate in the same direction and placed with their peripheral surfaces a distance apart less than the thickness of the nuts to be blanched, and means for delivering rows of spaced nuts at successive time intervals into the space between the said rollers, one of said rollers being provided with a longitudinal groove in its surface, adapted to receive and deliver the nuts from the space between the rollers.

5. In a nut blanching machine, a pair of parallel rollers adapted to rotate in the same direction and placed with their peripheral surfaces a distance apart less than the thickness of the nuts to be blanched, means for delivering rows of spaced nuts at successive time intervals into the space between the said rollers, one of said rollers being provided with a longitudinal groove in its surface adapted to receive and deliver the nuts from the space between the rollers, and means for removing from the nut bodies the skins broken and loosened by said rollers.

6. In a nut blanching machine, a pair of parallel rollers adapted to rotate in the same direction and placed with their peripheral surfaces a distance apart less than the thickness of the nuts to be blanched, means for delivering rows of spaced nuts at successive time intervals into the space between the said rollers, one of said rollers being provided with a longitudinal groove in its surface adapted to receive and deliver the nuts from the space between the rollers, and means for subjecting the nut bodies to a fluid blast to remove the skins broken and loosened by the aforesaid rollers.

7. A nut blanching machine, comprising a hopper, a pair of skin breaking and loosening rollers, means for delivering rows of spaced nuts at successive time intervals to said rollers, and means for removing the broken and loosened skins from the nut bodies.

8. A nut blanching machine, comprising a hopper, a pair of parallel, spaced, skin breaking and loosening rollers, adapted to rotate in the same direction, means for delivering rows of spaced nuts at successive time intervals from the hopper into the space between said rollers, and means for removing the broken and loosened skins from the nut bodies.

9. A nut blanching machine comprising a hopper, a pair of parallel, spaced, skin breaking and loosening rollers, means for delivering rows of spaced nuts at successive time intervals from the hopper into the space between said rollers, means for successively discharging the nut rows from the space between said rollers, and means for treating the nuts by a fluid blast to remove the broken and loosened skins from the nut bodies.

10. In a nut blanching machine, in combination with means for breaking and loosening the skins from the nuts, a hopper, means for delivering the nut bodies at successive time intervals to the said skin breaking means in rows of spaced nuts, comprising a plurality of upright tubes leading from said hopper, a roller associated with said tubes and adapted to direct the nut bodies into said tubes, a plurality of single nut receivers, one for each tube, and means for periodically discharging the nuts from said receivers.

11. In a nut blanching machine, in combination with means for breaking and loosening the skins from the nuts, a hopper, means for delivering the nut bodies at successive time intervals to the said skin breaking means in rows of spaced nuts, comprising a plurality of upright tubes leading from said hopper, a roller associated with said tubes and adapted to direct the nut bodies into said tubes, and means for bringing said nut bodies into longitudinal alinement with said tubes.

12. In a nut blanching machine, in combination with means for breaking and loosening the skins from the nuts, a hopper, means for delivering the nut bodies at successive time intervals to the said skin breaking means in rows of spaced nuts, comprising a plurality of upright tubes leading from said hopper, a roller associated with said tubes and adapted to direct the nut bodies into said tubes, a plurality of endless, flexible belts hung upon said roller, there being a belt for and extending through each tube, said belts being provided with spaced knots.

13. In a nut blanching machine, in combination with means for breaking and loosening the skins from the nuts, a hopper, means for delivering the nut bodies at successive time intervals to the said skin breaking means in rows of spaced nuts, comprising a plurality of upright tubes leading from said hopper, a roller associated with said tubes and adapted to direct the nut bodies into said tubes, a plurality of receivers, one for each tube, a plunger associated with each receiver, and means for operating said plungers in unison at predetermined time intervals.

14. In a nut blanching machine, in combination with means for breaking and loosening the skins, a pair of spaced rollers adapted to rotate in the same direction, means for discharging the nut bodies in rows of nuts, at time spaced intervals into the space between said rollers, means for discharging a blast of fluid on the row of nuts engaged between said rollers, and means for delivering the rows of nuts at successive time intervals from the space between the said rollers.

15. In a nut blanching machine, in combination with means for breaking and loosening the skins, a pair of spaced rollers adapted to rotate in the same direction, means for discharging the nut bodies in rows of nuts, at time spaced intervals into the space between said rollers, means for discharging a blast of fluid against the surface of one of said rollers on a line above the position occupied by the nut bodies operated upon.

16. In a nut blanching machine, means for removing the broken and loosened skins from the nut bodies, comprising a pair of parallel spaced rollers, one of said rollers being provided with a longitudinal groove in its surface, means for successively delivering rows of spaced nuts into the space between said rollers, means for discharging a fluid blast against said nuts while being subjected to the action of said rollers, and means for discharging a fluid blast against the surface of the grooved roller in a line above the nut receiving space.

17. In a nut blanching machine, means for removing the broken and loosened skins from the nut bodies, comprising a pair of parallel, spaced, rollers, one of said rollers being provided with a longitudinal groove in its surface, means for successively delivering rows of spaced nuts into the space between said rollers, means for discharging a fluid blast against the nuts while being subjected to the action of said rollers, means for discharging a fluid blast against the surface of the grooved roller in a line above the nut receiving space, a receptacle adapted to receive the nuts discharged by said grooved roller, a deflecting device below the nut receiving space, and a receptacle to catch the skins deflected thereby.

18. In a nut blanching machine, a pair of parallel rollers adapted to rotate in the same direction and placed with their peripheral surfaces a distance apart less than the thickness of the nuts to be blanched, one of said rolls rotating faster than the other, means for delivering rows of spaced nuts at successive time intervals into the space between the said rollers, and means for discharging the nuts from said space at successive time intervals.

19. In a nut blanching machine, a pair of parallel rollers adapted to rotate in the same direction and placed with their peripheral surfaces a distance apart less than the thickness of the nuts to be blanched, means for delivering rows of spaced nuts at successive time intervals into the space between the said rollers, means for removing from the nut bodies, the skins broken and loosened by the said rollers, and receptacles, one adapted to receive the blanched nut bodies, and the other, adapted to receive the skins removed therefrom.

20. In a nut blanching machine, a pair of parallel rollers adapted to rotate in the same direction, and placed with their peripheral surfaces a distance apart less than the thickness of the nuts to be blanched, one of said rolls rotating faster than the other, means for delivering rows of spaced nuts into the space between the said rollers, said means being actuated in timed relation with respect to the slower rotating roll, and means for subjecting the nut bodies to a fluid blast to remove the skins broken and loosened by the aforesaid rollers.

21. In a nut blanching machine, a pair of parallel rollers adapted to rotate in the same direction and placed with their peripheral surfaces a distance apart less than the thickness of the nuts to be blanched, means for delivering rows of spaced nuts at successive time intervals into the space between the said rollers, one of said rollers being provided with a longitudinal groove in its surface, adapted to receive and deliver the nuts from the space between the rollers, and means for maintaining the peripheries of said rollers in a dry condition.

22. In a nut blanching machine, a pair of parallel rollers adapted to rotate in the same direction and placed with their peripheral surfaces a distance apart less than the thickness of the nuts to be blanched, means for delivering rows of spaced nuts at successive time intervals into the space between the said rollers, one of said rollers being provided with a longitudinal groove in its surface, adapted to receive and deliver the nuts from the space between the rollers, a gravity controlled auxiliary hopper adapted to receive the nuts discharged by said groove in said roller, and means for subjecting the nut bodies to a fluid blast to remove the skins broken and loosened by the aforesaid rollers, said auxiliary hopper automatically delivering the nuts to said fluid blast when said auxiliary hopper receives its full capacity.

23. In a nut blanching machine, comprising a hopper, means for vibrating said hopper, a pair of skin breaking and loosening rollers, means for delivering rows of spaced nuts at successive time intervals to said rollers, and means for removing the broken and loosened skins from the nut bodies.

24. A nut blanching machine comprising a hopper, a pair of parallel, spaced, skin breaking and loosening rollers, one of said rollers being of a diameter smaller than that of the other roller, and rotating faster and in the same direction as that of the other roller, means for delivering rows of spaced nuts at successive time intervals from the hopper into the space between said rollers, and means for removing the broken and loosened skins from the nut bodies.

25. A nut blanching machine comprising a hopper, a pair of parallel, spaced, skin breaking and loosening rollers, means for delivering rows of spaced nuts at successive time intervals from the hopper into the space between said rollers, means for successively discharging the nut rows from the space between said rollers, means for treating the nuts by a fluid blast to remove the broken and loosened skins from the nut bodies, and means for rotating said nuts when being actuated upon by said fluid blast.

26. In a nut blanching machine, in combination with means for breaking and loosening the skins from the nuts, a vibratory hopper, means for delivering the nut bodies at successive time intervals, to the said skin breaking means in rows of spaced nuts, comprising a plurality of upright tubes leading from said hopper, a roller associated with said tubes and adapted to direct the nut bodies into said tubes, reciprocating devices in said tubes, said devices being adapted to support one end of said hopper and to impart a vibratory movement thereto, a plurality of single nut receivers, one for each tube, and means for periodically discharging the nuts from said receivers.

27. In a nut blanching machine, in combination with rollers for breaking and loosening the skins from the nuts, a hopper, means for delivering the nut bodies at successive time intervals, to the said skin breaking rollers in rows of spaced nuts, comprising a plurality of upright tubes leading from said hopper, a roller associated with said tubes and adapted to direct the nut bodies into said tubes, said last mentioned roller rotating faster and in the same direction as said skin breaking and loosening rollers, and being driven from one of said last mentioned rollers, and means for bringing said nut bodies into longitudinal alinement with said tubes.

28. In a nut blanching machine, in combination with means for breaking and loosening the skins from the nuts, a hopper, means for delivering the nut bodies at successive time intervals to the said skin breaking means in rows of spaced nuts, comprising a plurality of upright tubes leading from said hopper, a roller associated with said tubes and adapted to direct the nut bodies into said tubes, a ring surrounding the bottom end of each tube, a plurality of endless, flexible belts having bearing upon said rollers, there being a belt for and extending through each tube and ring associated therewith.

29. In a nut blanching machine, in combination with rollers for breaking and loosening the skins from the nuts, a hopper, means for delivering the nut bodies at successive time intervals to the said skin breaking rollers in rows of spaced nuts, comprising a plurality of upright tubes leading from said hopper, a roller associated with said tubes and adapted to direct the nut bodies into said tubes, a plurality of receivers, one for each tube, a plunger associated with each receiver, and means actuated by and during the rotation of one of said skin breaking and loosening rollers for operating said plungers in unison at predetermined time intervals.

30. In a nut blanching machine, in combination with means for breaking and loosening the skins, a pair of spaced rollers adapted to rotate in the same direction, means for discharging the nut bodies in rows of nuts, at spaced time intervals into the space between said rollers, means for discharging a blast of fluid on the row of nuts engaged between said rollers, one of said rollers having a groove in its periphery which is adapted to pick up and discharge the rows of nuts from the space between the said rollers.

31. In a nut blanching machine, in combination with a pair of rollers for breaking and loosening the skins, a second pair of spaced rollers located in a plane below and adapted to rotate in the same direction as said first mentioned rollers, means for discharging the nut bodies in rows of nuts, at spaced intervals into the space between said rollers from said skin breaking and loosening rolls, means for discharging a blast of fluid on the row of nuts engaged between second mentioned rollers, and means for discharging a blast of fluid against the surface of one of said rollers on a line above the position occupied by the nut bodies operated upon, one of said second pair of spaced rollers having a groove adapted to pick up the blanched nuts and remove them from the action of said fluid blast.

32. In a nut blanching machine, means for removing the broken and loosened skins from the nut bodies, comprising a pair of parallel, spaced rollers, one of said rollers being of a greater diameter than the other and being rotated slower than the other, and having a longitudinal groove in its surface, means for successively delivering rows of spaced nuts into the space between said rollers, a second pair of rollers adapted to receive the nuts from the groove in said first mentioned roller, means for discharging a fluid blast against said nuts while being subjected to the action of said second pair of rollers, and means for discharging a fluid blast against the surface of one of said second pair of rollers in a line above the nut receiving space.

33. In a nut blanching machine, means for removing the broken and loosened skins from the nut bodies, a pair of parallel, spaced rollers, one of said rollers being provided with a longitudinal groove in its surface one edge of which is defined by a lip, means for successively delivering rows of spaced nuts from said skin breaking and loosening means into the space between said rollers, means for discharging a fluid blast against the nuts while being subjected to the action of said rollers, means for discharging a fluid blast against the surface of the grooved roller in a line above the nut receiving space, a receptacle adapted to receive the nuts discharged by said grooved roller, a deflecting device below the nut receiving space adapted to be engaged by the lip on said roller and to be vibrated thereby, and a receptacle to catch the skins deflected thereby.

In testimony that I claim the foregoing as my invention I affix my signature, in the presence of two witnesses, this 5th day of January, A. D. 1917.

VICTOR F. SIMON.

Witnesses:
T. H. ALFREDS,
D. C. DARRENOUGUE.

Copies of this patent may be obtained for five cents each, by addressing the "Commissioner of Patents, Washington, D. C."